United States Patent [19]

Geanous et al.

[11] Patent Number: 4,767,968

[45] Date of Patent: Aug. 30, 1988

[54] SYSTEM FOR CONTROLLING THE OPERATION OF ELECTRICALLY POWERED APPARATUS

[75] Inventors: Michael Geanous; Richard G. Confer; Richard C. Bainbridge, all of Erie, Pa.

[73] Assignee: American Sterilizer Company, Erie, Pa.

[21] Appl. No.: 662,230

[22] Filed: Oct. 18, 1984

[51] Int. Cl.[4] .................................................. H05B 39/10
[52] U.S. Cl. ......................................... 315/90; 315/88; 315/131; 315/322
[58] Field of Search ................... 315/88, 90, 313, 322, 315/362, 130, 131, 153, 294

[56] References Cited

U.S. PATENT DOCUMENTS

| | | | |
|---|---|---|---|
| 3,678,286 | 7/1972 | Willis | 315/90 X |
| 3,790,846 | 2/1974 | Morris | 315/88 X |
| 3,883,777 | 5/1975 | Morita | 315/88 |
| 4,034,259 | 7/1977 | Schoch | 315/90 X |
| 4,068,216 | 1/1978 | Brouwer et al. | 315/130 X |
| 4,227,119 | 10/1980 | Murata et al. | 315/153 X |
| 4,250,432 | 2/1981 | Kohler | 315/362 X |
| 4,288,844 | 9/1981 | Fisher et al. | 362/3 X |
| 4,458,179 | 7/1984 | Bainbridge et al. | 315/313 X |
| 4,461,974 | 7/1984 | Chiu | 315/88 X |

Primary Examiner—David K. Moore
Attorney, Agent, or Firm—Kirkpatrick & Lockhart

[57] ABSTRACT

The preferred embodiment of the present invention provides a control system which permits operation of electrically powered apparatus in any one of several active modes from a controller mounted remotely from the apparatus. The system is particularly useful for controlling the operation of at least a pair of light sources. The system permits switching, from the controller, energizing power from an energized light source to a de-energized light source. Electrical communication between the controller of the system and the light head can be provided by only two electrical conductors.

6 Claims, 4 Drawing Sheets

SYSTEM FOR CONTROLLING THE OPERATION OF ELECTRICALLY POWERED APPARATUS

BACKGROUND OF THE INVENTION

1. Field of the Invention

The present invention relates to systems for controlling electrically powered apparatus, and, in particular, to a system which controls the mode of active operation of the apparatus.

2. Description of the Prior Art

It is desirable to control the operation of many types of electrically powered apparatus from a location remote from the apparatus. For example, many conventional surgical lights require manual switching of energizing power from one light source to another—either to achieve a change in the illumination pattern produced by the light or to energize an operable source upon failure of an energized source—by actuating a switch at the light head, the housing which contains and supports the light sources of the surgical light. If a person other than one of the members of the surgical team is provided to operate the surgical light at the light head, the already congested surgical area becomes even more congested. If a member of the normal surgical team is assigned the duty of operating the surgical light, that member's attention is periodically diverted from that member's normal duties to operate the light, with the possible degradation of overall performance by that member. Therefore, it is desirable to permit manual switching of energizing power from one source to another from a controller mounted at a location remote from the light head to permit its operation by a person other than a member of the normal surgical team and without adding to the congestion of the surgical area.

Further, it is highly desirable to provide electrical communication between tne controller and the apparatus along only two electrical conductors. Electrical communication along only two conductors is less bulky, less expensive and generates less electrical noise than communication systems requiring more than two conductors.

Electrical communication from a remotely located controller along only two conductors, of course, is common. However, known systems using only two conductors for electrical communication between the controller and the apparatus can switch the apparatus among only two relatively simple modes of operations, for example, remotely turning off or on electrical lights. Further, only one such mode—the mode in which the light is on—can be considered an active mode of operation. However, additional active modes of operation are often required. In the case of electrically operated surgical lights, the modes of active operation of the lights must ensure the continuous maintenance of proper illumination during the performance of surgical procedures. To ensure that illumination having an appropriate pattern is available during the performance of the procedure, surgical lights are provided with different types of light sources which provide different types of light patterns. The sources can be either different types of lamps or one type of lamp with multiple filaments, which create different types of illumination patterns. Further, the surgical light should provide an indication at the controller that a light source has failed to permit replacement of that source. With one exception, all systems known to applicants which employ only two electrical conductors between the controller and the surgical lights are incapable of providing the level of control—and, therefore, the active modes of operation identified briefly above—needed to meet the concerns presented by the performance of surgical procedures. Such known systems permit only energizing or de-energizing remotely a single set of lights in a surgical suite. Accordingly, the loss of a light source of a surgical light causes the degradation or total loss of lighting of the surgical site. The remaining system of which applicants are aware is described in U.S. patent application Ser. No. 362,117, filed Mar. 26, 1982, which is owned by the assignee of the present application, that switches energizing power from one filament of a lamp to another by reversing the polarity of the voltage applied to the light head of the surgical light by the controller.

A further problem pertaining to surgical lighting arises upon failure of a light source. If an energized light source fails, a backup light source must be energized quickly. If a backup light source fails, it must be replaced immediately to ensure that backup lighting is available in the event that an energized source fails. Many conventional surgical lights include a lighting control system which permits manual switching at the light head of energizing power from a failed source to a backup source, which is commonly a source of the type which provides an illumination pattern different from those provided by the energized sources and by the failed source. Requiring manual switching of energizing power from a failed light source to an operable source presents the obvious disadvantage of temporary loss of illumination between the times of failure of the failed source and energization of the backup source. Further, applicants are not aware of any surgical lights which provide an indication that a backup light source has failed.

Therefore, there is a need for a system for controlling the mode of active operation of electrically powered apparatus having a controller mounted at a location remote from the apparatus which communicates with the apparatus over only two electrical conductors. Further, there exists a need for a lighting control system which automatically de-energizes a failed light source and energizes an operable source upon failure of an energized source. Further, there is a need for a control system which monitors the operability of a backup light source to ensure that the backup source is available upon failure of an energized source.

SUMMARY OF THE INVENTION

The present invention provides a system for providing electrical communication between a controller and electrically powered apparatus, the operation of which can be controlled by operation of the controller. The system includes a source of electrical power located at the controller suitable for energizing the controlled apparatus to operate it. Provision is made for transmitting the electrical energizing power to the controlled apparatus. Apparatus is located at the controller for interrupting the transmitted electrical energizing power, and apparatus is located at the controlled apparatus for recognizing the interruption of transmitted electrical energizing power and changing the mode of active operation of the controlled apparatus in response thereto. Preferably, provision is made at the controlled apparatus for interrupting the transmitted electrical energizing power, and provision is made at the controller for recognizing the interruption of transmitted electrical energizing power caused by the controlled apparatus and performing a desired function in response thereto. Preferably, the controlled apparatus causes the interruption of transmitted electrical energizing power by interrupting the flow of electrical current between the controller and the controlled apparatus. Preferably, the controller causes interruption of transmitted electrical energizing power by interrupting the application of voltage to the controlled apparatus.

The controlled apparatus can be an electric light having at least two sources of visible light. The electric light operates in at least two active modes. The light operates in a first active mode when a first light source is energized by the electrical power source and the second light source is not energized by the electrical power source. The light operates in a second active mode when the first light source is not energized by the electrical power source and the second light source is energized by the electrical power source. Preferably, each light source includes a filament capable of emitting visible light when the filament is energized by the electrical power source. The filament interrupts the flow of current between the controller and the electric light when the filament fails.

A further system is provided by the present invention which controls the operation an electric light having at least two sources of visible light which can be individually energized electrically to produce visible light. The system includes a controller and a source of voltage located at the controller. The voltage produced by the voltage source is suitable for energizing the light sources to cause the light sources to produce light. A pair of electrical conductors is provided along which the energizing voltage produced by the voltage source is applied to the electric light. Provision is made for receiving the applied energizing voltage and energizing the light source in response thereto. Provision is made at the controller for interrupting the application of energizing voltage by the voltage source to the electric light. Provision is made at the electric light for recognizing the interruption and switching energizing voltage from the energized light source to the de-energized light source in response thereto. Preferably, the light source to which energizing voltage is applied creates an interruption in the current flowing between the controller and the light sources when the energized light source fails. The controller interprets the existence of the current interruption as an indication that the energized light source has failed.

A further system is provided by the present invention for providing electrical communication between a controller and electrically powered apparatus which is operable in at least two active modes. The operation of the controlled apparatus can be controlled by operation of the controller. The system includes a source of electrical power located at the controller suitable for energizing the controlled apparatus to operate it. Provision is made for transmitting to the controlled apparatus the electrical energizing power generated by the source of electrical power. Provision is made at the controller for interrupting the transmitted electrical energizing power by causing the level of the energizing power to drop below a predetermined level for a predetermined period of time. A switch assembly is operably associated with the controlled apparatus which is adapted to operate in at least two states. The switch assembly causes operation of the controlled apparatus in its first active state when the switch assembly is in a first state and causes operation of the controlled apparatus in its second active state when the switch assembly is in a second state. The switch assembly defines an input adapted to receive control signals. The switch assembly assumes its first state when a control signal of tbe first type is applied to the input and the switch assembly assumes its second state when a control signal of the second type is applied to the input. Apparatus is provided for generating the control signals. The control signal generating apparatus defines an input which is in electrical communication with the switch assembly input. The control signal generating apparatus generates control signals at its output to apply the control signals to the switch assembly. The control signal generating apparatus defines a switch input. The control signal generating apparatus changes the type of control signal produced at its output each time a switch signal is applied to the switch input. Apparatus is provided for receiving the energizing power and applying switch signals to the switch input of the control signal generating apparatus The receiving apparatus applies a switch signal to the switch input each time the level of energizing power drops below the predetermined level for the predetermined period of time. The controlled apparatus can be an electric light having at least two light sources each of which produces visible light when the energizing power is applied to the light source. The switch assembly can include a first switch operably associated with the first light source and a second switch operably associated with the second light source. Each switch is operably connected to the energizing power and is adapted to operate in at least two states. The switch applies energizing power to its associated light source when the switch is in a first state and does not apply energizing power to the associated light source when the switch is in the second state. The switch assembly is in its first state when the first switch is in its first state and the second switch is in its second state. The switch assembly is in its second state when the first switch is in its second state and the second switch is in its first state. The switch assembly input includes an input defined by each switch. Each switch assumes its first state when a control signal of the first type is applied to its input and the switch assumes its second state when a control signal of the second type is applied to its input.

A further system is provided by the present invention which provides electrical communication between a controller and an electric light having at least two sources which produce visible light when suitable energizing power is applied thereto. The system includes a source of suitable electrical energizing power located at the controller. Provision is made for transmitting the energizing power to the electric light. Control apparatus is provided for selectively energizing the light sources, either, but not both, the light sources being energized at any one time. Apparatus is provided for monitoring the integrity of the de-energized light source, determining when the de-energized light source has failed, and providing an indication that the de-energized light source has failed. Preferably, the monitoring apparatus monitors the integrity of the de-energized light source by monitoring the voltage on the low side of each of the de-energized light source and the energized light source. The monitoring means determines that the de-energized light source has failed when the voltage at both low sides drops below a predetermined level.

A further system is provided by the present invention for providing electrical communication between a controller and an electric light having at least two sources which produce visible light when suitable energizing power is applied thereto. The system includes a source of suitable electrical energizing power located at the controller. Provision is made for transmitting the energizing power to the electric light. Control apparatus is provided for selectively energizing the light sources, either, but not both, the light sources being energized at any one time. Apparatus is provided for monitoring the integrity of the energized light source, determining when the energized light source has failed and causing the control apparatus to de-energize the energized light source and energize the de-energized light source when the energized light source fails. Preferably, the monitoring apparatus monitors the integrity of the energized light source by monitoring the level of illumination provided by the energized light source. The monitoring apparatus determines that the energized light source has failed when the illumination provided by the energized light source drops below a predetermined level. The monitoring apparatus can provide an indication that an energized light source has failed.

When used herein the terms "modes of active operation", "active modes of operation" and "active modes" shall be construed to mean a mode of operation of electrically powered apparatus wherein the apparatus is not de-energized.

BRIEF DESCRIPTION OF THE DRAWINGS

The following detailed description of the preferred embodiments can be understood better if reference is made to the drawings in which.

DETAILED DESCRIPTION OF THE PREFERRED EMBODIMENTS

System 10 can be employed to control the active modes in which any electrical apparatus is adapted to operate. However, to facilitate describing system 10, system 10 will be described below in the form in which it is employed to control the active modes in which a surgical light operates.

Figure 2:
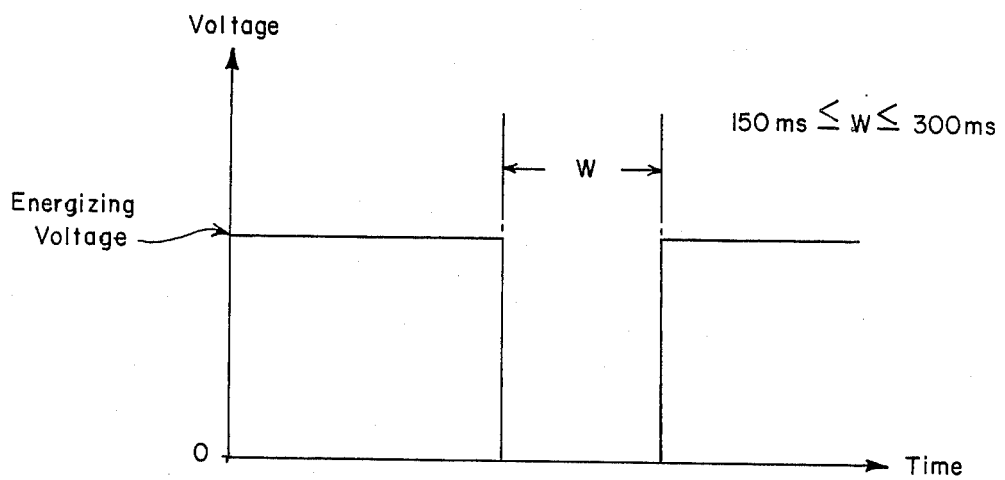
FIG. 2 is a graphical representation of a low voltage pulse produced by the system shown in FIG. 1.

System 10 includes a controller 18, a light head 13, which supports a control circuit 12, and a cable 20. Light head 13 includes a lamp which has a pair of light producing filaments. Each filament of the lamp produces a pattern of illumination different from that produced by the remaining filament. Controller 18 includes a DC power supply that produces energizing power which is applied to light head 13 along cable 20. The energizing power is used to provide control power for control circuit 12 and for energizing power for the filaments supported by light head 13. A push button 15 is provided at controller 18, actuation of which causes energizing power to be switched from the energized filament to the de-energized filament. Push button 15 decreases energizing power to ground momentarily. Such a decrease of energizing power to ground will be referred to hereinafter as a "low voltage pulse". Light head 13 interprets its receipt of a low voltage pulse as an instruction to switch energizing power from the energized filament to the de-energized filament and effects that instruction. The duration of the low voltage pulse is less than 300 milliseconds to ensure that there is no apparent loss of light. Circuit 12 ignores all low voltage pulses of a duration less than 150 milliseconds to ensure that transients in the energizing voltage are not misinterpreted by circuit 12 as instructions to switch energizing power from one filament to another. A typical low voltage pulse is shown graphically in FIG. 2.

Figure 1:
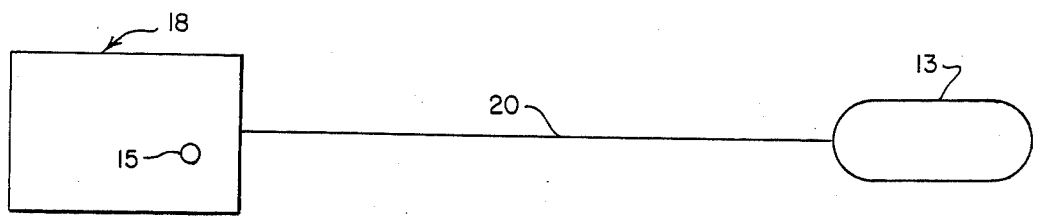
FIG. 1 is a schematic representation of a lighting control system provided by the present invention.
Figure 3:
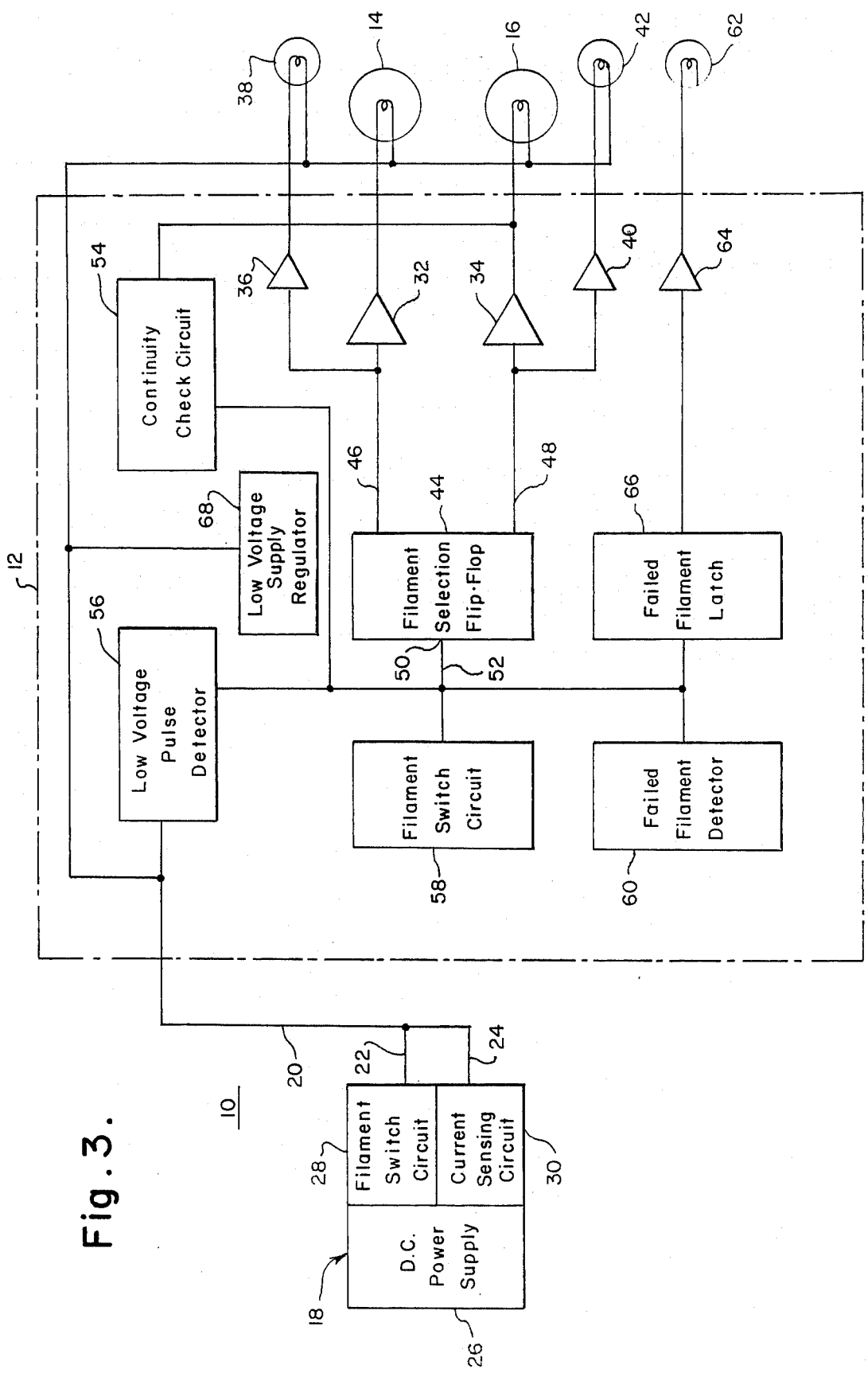
FIG. 3 is a block diagram representation of a lighting control system suitable, for implementing the system shown in FIG. 1.

There are known circuits suitable for implementing system 10 shown in FIG. 1. However, the control circuit disclosed and claimed in an application for United States Letters Patent entitled CONTROL CIRCUIT FOR SYSTEM FOR CONTROLLING THE OPERATION OF ELECTRIC LIGHTS, that was filed on the same day on which the present application was filed, and which is owned by the assignee of the present application, is preferable for implementing control circuit 12 and is shown in FIGS. 3 and 4 herein and described in detail below.

The surgical light that is controlled by system 10 has more than one light source. The light sources should be of two types, which provide illumination of different patterns. For purposes of describing system 10, system 10 is presented below as it is used to control a surgical light including light producing lamps (not shown), each of which includes two light producing filaments 14 and 16. Each filament 14 and 16 is so arranged in the lamp that it provides an illumination pattern of a type different from that provided by the remaining filament. In particular, filament 14 represents a filament employed by a lamp which provides a relatively small lighting pattern of high intensity, and filament 16 represents a filament employed by a lamp which provides a lighting pattern of relatively large size and low intensity. Filaments 14 and 16 are not energized simultaneously. Therefore, the de-energized filament 14 or 16 is available as a backup in the event of a failure of the energized filament. Such a surgical light is described in U.S. Pat. No. 4,288,844.

System 10 employs a controller IS and a cable 20, which provides electrical communication between controller 18 and a control circuit 12. Controller 18 is located away from the sterile field of the operating room. Circuit 12 is contained by light head 13, which supports the lamps that provide illumination. System 10 is capable of performing the following functions:

1. Continuously check the de-energized filament 14 or 16 and provide a visual indication at both light head 13 and controller 18 of the failure of a de-energized filament;
2. Determine the failure of an energized filament, provide a visual indication at both the light head and controller 18 of the failure of an engerized filament, de-energize the failed filament, and energize the remaining filament;
3. Permit switching at the light head of energizing power from the energized filament to the de-energized filament;
4. Permit switching from controller 18 of energizing power from the energized filament to the de-energized filament;
5. Provide a visual indication at light head 13 that both filaments 14 and 16 have failed; and 6. Provide a visual identification at light head 13 of the filament that is energized.

Therefore, the surgical light can operate in the following active modes:

1. Filament 14 is energized and operable, filament 16 is de-energized and operable, and indicator lamp 38 is energized;
2. Filament 14 is de-energized and operable, filament 16 is energized and operable, and indicator lamp 42 is energized;
3. Filament 14 is de-energized and inoperable, filament 16 is energized and operable, indicator lamps 42 and 62 are energized, and the failed filament indicator lamp at controller 18 is energized;
4. Filament 14 is energized and operable, filament 16 is de-energized and inoperable, and indicator lamps 38 and 62 are energized, and the failed filament indicator lamp at controller 18 is energized; and
5. Either of filaments 14 or 16 is energized, both filaments 14 and 16 have failed, indicator lamp 62 is energized continuously, indicator lamps 38 and 42 are flashing, and the failed filament indicator lamp at controller 18 is energized.

Cable 20 includes a pair of electrical conductors 22 and 24 that carry electrical information between controller 18 and circuit 12.

Controller 18 includes a conventional regulated DC power supply 26, filament switch circuit 28, and current sensing circuit 30. Power supply 26 applies energizing power, which is suitable for energizing fiaments 14 and 16, in the form of DC voltage, to circuit 12 along lines 22 and 24. Further, circuit 12 converts the energizing power to +15 volts DC which is used as control power and to energize the indicator lamps of circuit 12. Filament switch circuit 28 includes conventional circuitry, such as a two position switch, for selectively and manually applying a low voltage pulse to circuit 12. The low voltage pulse is interpreted by circuit 12 as an instruction to switch energizing power from the energized filament to the de-energized filament. Current sensing circuit 30 detects the interruption in the current flowing between controller 18 and circuit 12, that is caused by the failure of filament 14 or 16, which circuit 30 interprets as an indication that a filament 14 or 16 has failed. Current sensing circuit 30 energizes an indicator light (not shown) located at controller 18 that indicates that a filament 14 or 16 of light head 13 has failed when it senses an interruption in the current flowing along cable 20. Current sensing circuit 30 can be any suitable known circuit.

Control circuit 12 includes a driver 32 which operates filament 14, a driver 34 which operates filament 16, an indicator driver 36 which operates indicator lamp 38, and an indicator driver 40 which operates indicator lamp 42. Filament selection flip-flop 44 determines to which filaments energizing power is applied by operating drivers 32, 34, 36 and 40. Filament selection flip-flop 44 produces two signals, S and L, along lines 46 and 48, each of which can assume a high condition, or a logical "1" state, and a low condition, or a logical "0" state. Signal S is applied to both filament 14 and indicator 38, and signal L is applied to both filament 16 and indicator 42. Filament 14 and indicator 38 are energized or de-energized together, and filament 16 and indicator 42 are energized or de-energized together by flip-flop 44. Therefore, an ignited indicator 38 indicates that filament 14 is energized, and an ignited indicator 42 indicates that filament 16 is energized. Signals S and L never assume the same logical state. Accordingly, either indicator 38 and filament 14, or indicator 42 and filament 16 are energized at the same time. Each time flip-flop 44 receives a switch signal, for example a positive pulse exceeding a predetermined threshold, at its input 50 along line 52, the outputs S and L of flip-flop 44 change their states to switch energizing power from the energized filament 14 or 16 to the de-energized filament. Each of continuity check circuit 54, low voltage pulse detector 56, filament switch circuit 58, and failed filament detector 60 are adapted, under predetermined conditions, to apply a positive pulse to input 50 of flip-flop 44 along line 52 to change the states of its outputs S and L.

Continuity check circuit 54 energizes failed filament indicator 62, which is located at light head 13, if a de-energized filament fails. Also, when a de-energized filament fails, continuity check circuit 54 applies a positive pulse to flip-flop 44 to cause flip-flop 44 to energize the failed filament, which interrupts the current flowing between controller 18 and circuit 12. The current interruption is detected by current sensing circuit 30 at controller 18 and sensing circuit 30 energizes the indicator lamp located at controller 18 that indicates the existence of a failed filament at light head 13. Shortly after continuity check circuit 54 causes the failed filament to be energized, failed filament detector 60, which is described in detail below, detects that a failed filament 14 or 16 is energized and applies a positive pulse to flip-flop 44 to cause flip-flop 44 to de-energize the failed filament and energize the remaining operative filament. Further, continuity check circuit 54 latches on failed filament driver 64 to ensure that failed filament indicator 62 remains energized unless power is removed from circuit 12 and the failed filament is replaced.

Failed filament detector 60 applies a positive pulse to filament selection flip-flop 44 to de-energize an energized filament 14 or 16 that has failed and to energize the de-energized filament. Also, when failed filament detector 60 senses a failed energized filament, it causes failed filament latch 66 to latch on failed filament driver 64 to ensure that failed filament indicator 62 remains energized unless power is removed from circuit 12 and the failed filament is replaced. Failure of an energized filament 14 or 16 interrupts the flow of current between controller 18 and circuit 12. The current interruption is sensed by current sensing circuit 30 which energizes the failed filament indicator located at controller 18.

Filament switch circuit 58 can be used to manually, at light head 13, apply a positive pulse to the input 50 of flip-flop 44 to cause flip-flop 44 to change the state of its outputs S and L and to switch energizing power from the energized filament to the de-energized filament.

Low voltage pulse detector 56 senses the transmission of a low voltage pulse from controller 18 to circuit 12 and, in response thereto, applies a positive pulse to input 50 of filament selection flip-flop 44, which switches energizing power from the energized filament to the de-energized filament.

Low voltage supply regulator 68 provides positive 15 volt control voltage for circuit 12 at all times during operation of the system, and provides energizing power for indicators 38, 42, and 62.

Figure 4A:
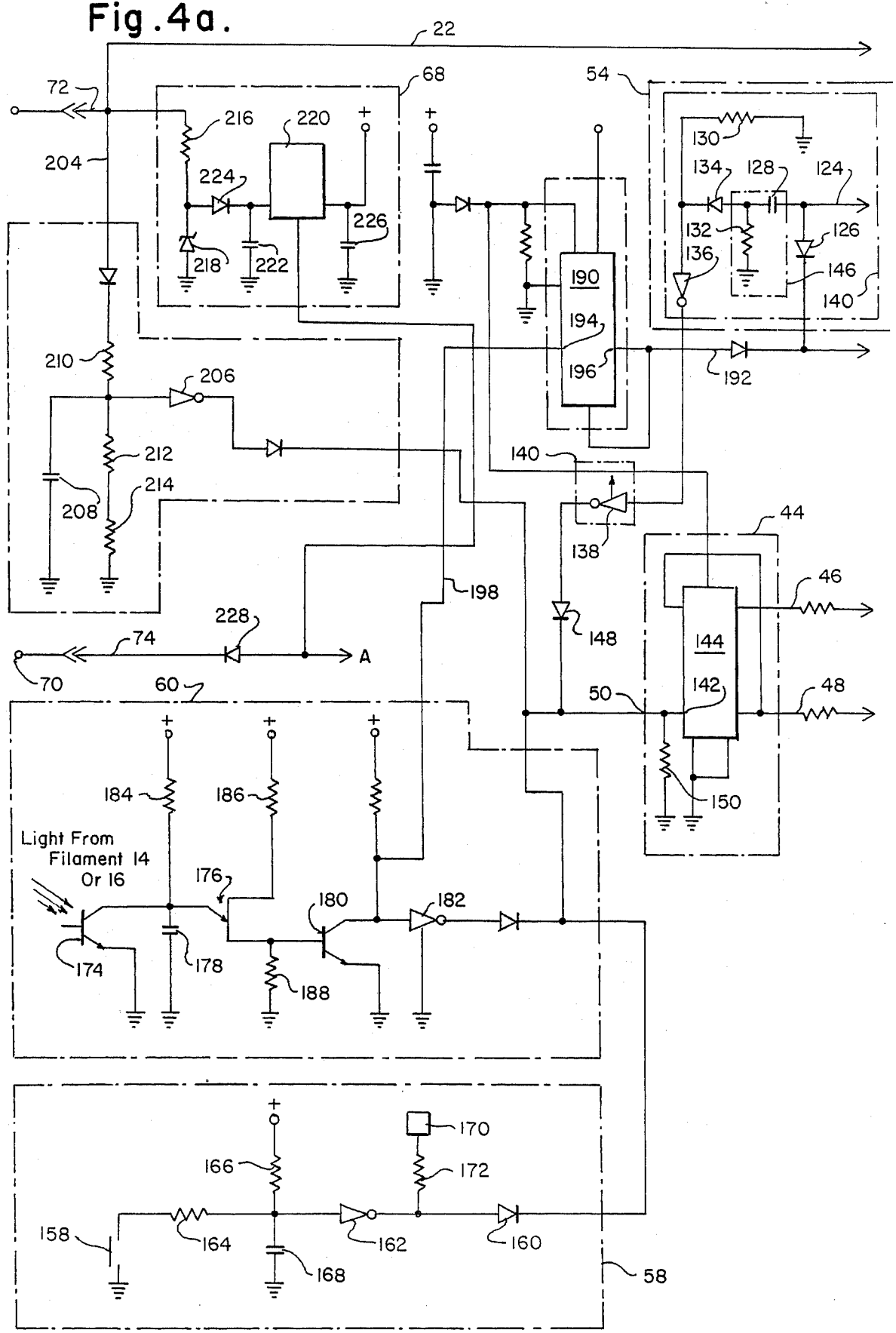
FIGS. 4a and 4b are schematic representations of a circuit that can be used to implement the block diagram of the control circuit shown in FIG. 3.
Figure 4B:
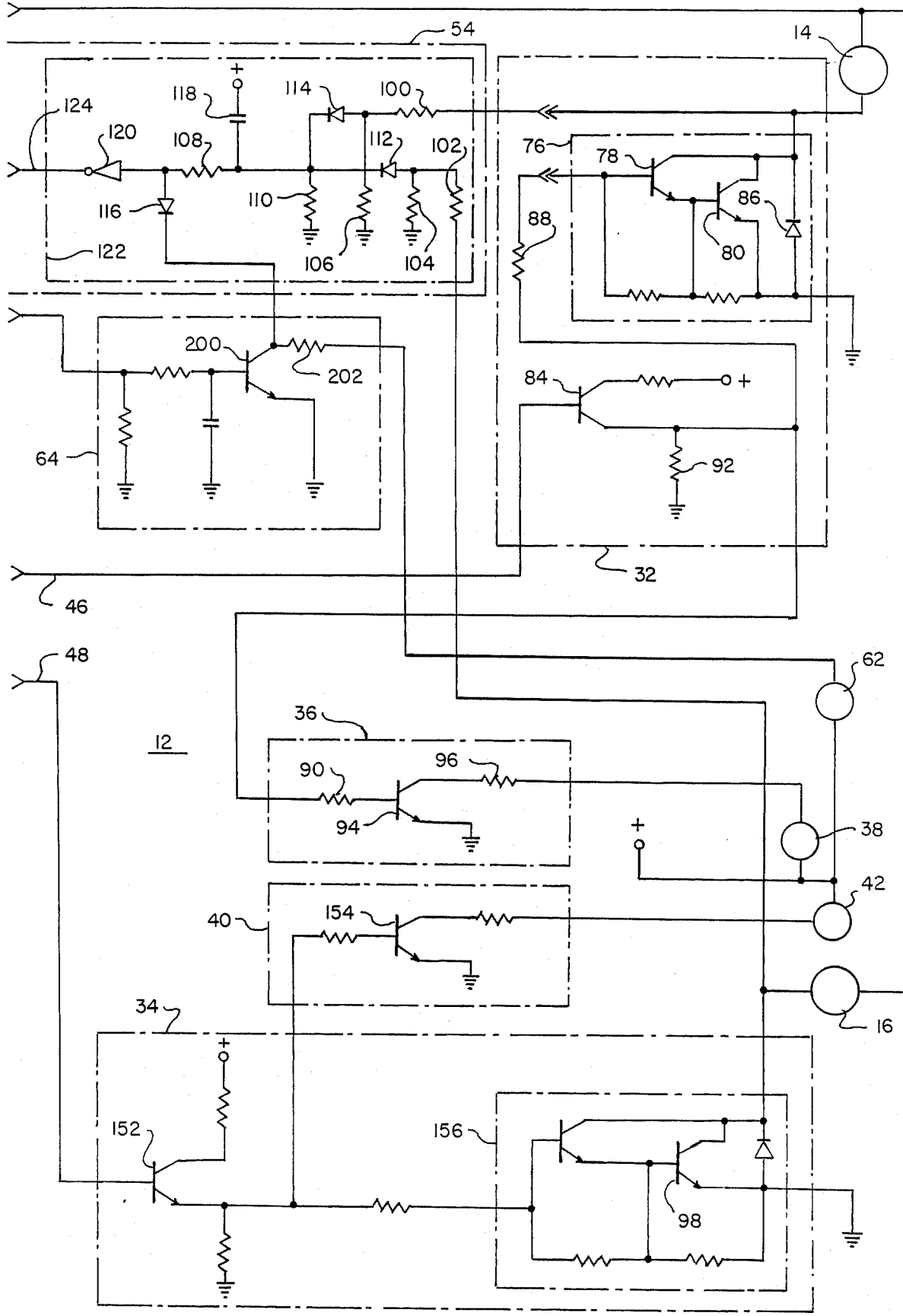

FIGS. 4a and 4b show the details of a circuit which is particulary suitable for implementing control circuit 12 shown in FIG. 3. Controller 18 applies power to circuit 12 at terminals 68 and 70. Line 72 is high and line 74 is circuit ground.

Filament drive circuit 32 includes a Darlington pair switching circuit 76 having a pair of transistors 78 and 80 which are operated in their switching modes. When transistor 78 is switched on, transistor 80 is switched on and energizing power from lines 72 and 82 is applied to filament 14. When transistor 78 is turned off, transistor 80 is turned off and energizing power from lines 72 and 82 is removed from filament 14 to extinguish it. Transistor 84 controls the switching of transistor pair 76. Transistor 84 is operated in its switching mode. When transistor 84 is turned on, transistor pair 76 is turned on and energizing power is applied to filament 14. When transistor 84 is turned off, transistor pair 76 is turned off and filament 14 is disconnected from energizing power. Diode 86 provides protection for transistor 80. Resistor 88 and resistor 90, which is a part of driver 36 and described below, limit the current flowing through transistor 84 to an acceptable level. Resistor 92 establishes the proper triggering voltage for transistor 84 and transistor pair 76.

The operation of driver 36 also is controlled by transistor 84. Transistor 94 operates in its switching mode. When transistor 94 is turned on, indicator 38 is connected to the positive 15 volt supply, which is produced by low voltage supply regulator 68, through transistor 94 and resistor 96. When transistor 94 is turned off, indicator 38 is disconnected from low voltage supply 68. Resistor 90 and resistor 88, identified above, limit the current flowing through transistor 84. The resistances of resistors 88 and 90 are different from each other due to the different levels of base current required for operation of transistors 94 and 78. When transistor 84 of driver 32 is turned on, transistor 94 is turned on and indicator 38 is energized. When transistor 84 is turned off, transistor 94 is turned off and indicator 38 is de-energized.

The elements constituting filament driver 34 and driver 40, and the arrangement and functioning of those elements are identical to those of drivers 32 and 36, respectively. Therefore, further description of those circuits is not provided.

Continuity check circuit 54 detects the existence of a failed de-energized filament 14 or 16, provides an indication to controller 18 that a de-energized filament has failed, energizes indicator 62 to indicate that a filament has failed and latches on indicator driver 64 to ensure that indicator 62 will remain energized unless power is removed from circuit 12 and the failed filament is replaced. Continuity check circuit 54 detects a failed filament by monitoring the voltage across the collector of each of transistor 80 and transistor 98 of driver 34. If the voltage across both collectors falls below a minimum level, then, at least, the de-energized filament 14 or 16 has failed.

Resistors 100, 102, 104, 106, 108 and 110, diodes 112, 114 and 116, capacitor 118, and inverter 120, constitute a NOR gate 122, which produces a logical "1", or high, state on line 124 when a failed de-energized filament 14 or 16 is detected. Resistors 100, 102, 104 and 106 form voltage dividers which reduce the voltage applied to inverter 120 to its rated voltage. Capacitor 118 and resistors 108 and 110 form a time delay circuit which prevents circuit 54 from interpreting a low voltage across both transistors 80 and 98 as a failed de-energized filament unless the length of time during which the absence of voltage persists exceeds a predetermined minimum. Accordingly, a momentary low voltage condition at the collectors of both transistors 80 and 98, which, for example, occurs when energizing power is switched purposely from one of filaments 14 or 16 to the remaining filament, will not cause circuit 54 to conclude that there is a de-energized filament failure. Accordingly, inverter 120 produces a logical "1" only if the collector voltages of both transistors 80 and 98 fall below the predetermined minimum level for a period of time that exceeds the minimum duration set by capacitor 118 and resistors 108 and 110. The function of diode 126 will be described below in the description of failed filament indicator driver 64.

Capacitor 128, resistors 130 and 132, diode 134, inverter 136, and inverter 138 form a monostable multivibrator 140, which applies a positive pulse to input 142 of flip-flop 144 of selection flip-flop 44 when a failed de-energized filament is detected. Each of inverters 136 and 138 constitute a Schmitt trigger. Capacitor 128 and resistor 132 form a differentiator 146 which produces a short positive pulse each time the output of inverter 120 changes from a logical "0" state to a logical "1" state. Diode 134 ensures that only positive pulses are differentiated by differentiator 146. Inverter 136 shapes and inverts the output of differentiator 146 when the output of differentiator 146 exceeds a predetermined threshold relative to a reference voltage established by resistor 130. Because the shaped pulse produced by inverter 136 is negative, inverter 138 is provided to apply a positive pulse to input 142 of flip-flop 144. Diode 148 prevents signals which are fed to input 142 of flip-flop 144 by circuits shown in FIG. 4a from being reflected back into continuity check circuit 54.

Filament selection flip-flop 44 switches energizing power from one of pairs (i) filament 14 and indicator 38, and (ii) filament 16 and indicator 42 to the remaining pair. Filament selection flip-flop 44 includes flip-flop 144 and resistor 150. Each time clock input 142 of flip-flop 144 receives a positive pulse, outputs S and L on lines 46 and 48 change their logical states, that is, they change from a high, or "1", state to a low, or "0", state or from a low state to a high state. When output 48 is high, transistor 152 is turned on and, accordingly, transistor 154 and Darlington transistor pair 156 are turned on and filament 16 and indicator 42 are energized. When output 46 is high, transistor 84 and Darlington transistor pair 76 are turned on to energize filament 14 and indicator lamp 38. Signals S and L never assume the same state. Therefore, filaments 14 and 16 are never energized simultaneously and indicators 38 and 42 are never energized simultaneously.

Filament switch circuit 58 permits manual switching of energizing power from one of filament 14 or 16 to the remaining filament. A push button switch 158 is connected between the input 50 of filament selection flip-flop 44 and circuit ground through diode 160, Schmitt trigger inverter 162, and resistor 164. The filament which is energized is changed each time switch 158 is actuated. Resistors 164 and 166 form a voltage divider at the input to inverter 162. Resistors 164 and 166 are so sized that when switch 158 is closed the input to inverter 162 is a logical "0", since the voltage dropped across resistor 164 is lower than the threshold voltage of inverter 162, and inverter 162 produces a logical "1". When switch 158 is opened, an open circuit is introduced between resistor 164 and circuit ground, capacitor 168 becomes fully charged, and the input to inverter 162 rises above its threshold, and inverter 162 produces a logical "0". When inverter 162 produces a logical "1", a positive pulse is applied to input 142 of flip-flop 144, which causes outputs S and L on lines 46 and 48 to change states to switch energizing power from the filament 14 or 16 which was energized to the remaining filament. Block 170 represents a test point, which is current limited through resistor 172. If the voltage reading at point 170 remains high during operation of circuit 12, it can be assumed that filament switch circuit 58 has failed.

Failed filament detector 60 detects failure of an energized filament, energizes failed filament indicator 62, switches energizing power from the failed filament 14 or 16 to the remaining de-energized filament, and ensures that indicator 62 remains energized unless power is removed from circuit 12 and the failed filament is replaced. Transistor 174 is a photosensitive transistor. When either filament 14 or filament 16 is producing proper illumination, transistor 174 receives light sufficient to maintain it on and the input to unijunction transistor 176 is, essentially, connected to circuit ground through transistor 174. If an energized filament 14 or 16 fails, transistor 174 receives insufficient light to remain on and, therefore, switches off, and capacitor 178 begins to charge. The input to transistor 176 rises to a level sufficient to turn on transistor 176 and transistor 176 turns on until capacitor 178 discharges to a level that is insufficient to maintain transistor 176 on, all of which results in the application of a positive pulse to the base of transistor 180. When transistor 176 turns on, the input to transistor 180 goes from, essentially, ground to a value sufficient to turn on transistor 180. Accordingly, transistor 180 receives a positive pulse from transistor 176 and creates a negative pulse, which is inverted and shaped by inverter 182 and applied to input 142 of flip-flop 144 to switch energizing power from the failed filament 14 or 16 to the remaining filament.

If the backup filament also has failed, detector 60 begins to oscillate and causes indicators 38 and 42 to flash. When the energized filament fails, the light input to transistor 174 falls below the threshold level needed to maintain it on, transistor 174 opens and capacitor 178 begins to charge at the rate determined by the size of resistor 184. When the voltage drop across capacitor 178 reaches the trigger threshold of transistor 176, which is determined by the sizes of resistors 186 and 188, transistor 176 turns on and causes a positive pulse to be applied to input 142 of flip-flop 144, as is described generally above. However, when transistor 176 is on, capacitor 178 discharges through transistor 176 at a much higher rate than that at which it is charged by the positive 15 volt supply, to which it is connected, if the resistance values of resistors 184, 186, and 188 are chosen properly. Accordingly, if the remaining filament 14 or 16 is not ignited when flip-flop 144 receives a pulse at input 142 from inverter 182—for instance, when the remaining filament also has failed—the voltage across capacitor 178 will drop to a level that is insufficient to maintain transistor 176 on, and transistor 176 will turn off. At that point, the positive 15 volt supply again begins to charge capacitor 178 until the voltage across it reaches the threshold of transistor 176 and transistor 176 again turns on. When both filaments 14 and 16 are failed, transistor 176 will be turned on and off by capacitor 178 repeatedly, thereby repeatedly applying positive pulses to input 142 of flip-flop 144—and, therefore, switch energizing power between filaments 14 and 16 repeatedly—until transistor 174 receives light at a level greater than its threshold level, which would short capacitor 178 and cause it to become discharged.

Indicators 38 and 42 will flash, alternately with respect to each other, at one half the rate at which positive pulses are applied to flip-flop 144 by failed filament detector 60. The flashing indicators indicate that both filaments 14 and 16 have failed. The relative sizes of resistors 184, 186, and 188 should be chosen to ensure that an operable backup light can produce light sufficient to turn on transistor 174 before detector 60 begins oscillating. Suitable sizes for resistors 184, 186, and 188 are shown in FIG. 4a.

Failed filament latch 66 ensures that once failed filament indicator 62 is energized, it remains energized until power is removed from circuit 12 and each failed filament is replaced with an operative filament. When circuit 12 is energized, flip-flop 190 produces a logical "0" on line 192. The first time the clock input 194 of flip-flop 190 receives a positive pulse, output 196 of flip-flop 194 assumes a logical "1" state. Any additional positive pulses received by input 194 have no effect on the output of flip-flop 190 at 196. Input 194 of flip-flop 190 receives a positive pulse from the failed filament detector 60 along line 198 when an energized filament fails. Output 196 assumes a logical "1" state, which provides a positive input to failed filament indicator driver 64. Transistor 200 is turned on, which causes the positive 15 volt supply to be applied to indicator 62 through resistor 202 and transistor 200. Because output 196 is latched in its logical "1" state, failed filament indicator 62 will remain energized unless energizing power is removed from circuit 12 and the failed filament 14 or 16 is replaced by an operative filament.

Further, indicator 62 is energized by filament continuity check circuit 54 when a de-energized filament 14 or 16 fails. When a de-energized filament 14 or 16 fails, inverter 120 applies a positive signal to the base of transistor 200 through diode 126, thus turning it on and energizing failed filament indicator 62. Further, because the input to inverter 120 is low, the collector of transistor 200 remains low, thus ensuring that indicator 62 will remain energized unless energizing power is removed from circuit 12 and the failed filament is replaced. Whether indicator 62 was energized by failed filament detector 60 because an energized filament 14 or 16 failed, or by continuity check circuit 54 because a de-energized filament failed, indicator 62 will not remain de-energized after energizing power has been removed from circuit 12 and subsequently restored unless the failed filament is replaced by an operative filament. For example, if filament 16 fails and circuit 12 is de-energized and then subsequently energized without replacing filament 16, circuit 12 will attempt to either energize failed filament 16, or it will energize filament 14, depending on which filament circuit 12 normally energizes when it initially receives power from controller 18. In the former case, failed filament detector 60 causes indicator 62 to be energized. In the latter case, continuity check circuit 54 energizes indicator 62.

Low voltage pulse detector 56 receives filament energizing power on line 204. When low voltage pulse detector 56 receives a low voltage pulse, it causes the removal of energizing power from the energized filament 14 or 16 and application of energizing power to the remaining filament. Inverter 206 is a Schmitt trigger which produces a positive pulse when its input falls below a predetermined threshold. Accordingly, when low voltage pulse detector 56 receives a low voltage pulse from controller 18, the input to inverter 206 momentarily falls below its threshold and inverter 206 applies a positive pulse to clock input 142 of filament selection flip-flop 144 to remove energizing power from the energized filament 14 or 16 and apply energizing power to the remaining filament. As is described above, the low voltage pulse can be created by push button 15 located at controller 18, which momentarily interrupts the energizing power when it is actuated. Push button 15 of controller 18 creates a low voltage pulse of a duration that is longer than those of the voltage gaps inherent in the 60 Hz full wave rectified supply voltage constituting the energizing power, and other short duration transients. The duration of the low voltage pulse should not be so long that a noticeable absence of illumination is created. Capacitor 208 and resistors 210, 212, and 214 are provided and sized to prevent inverter 206 from applying positive pulses to filament selection flip-flop 44 upon the occurrence of such transients. When energizing power is available, capacitor 208 is fully charged. Upon occurrence of a voltage gap, due either to a low voltage pulse or transients, capacitor 208 begins to discharge through resistors 212 and 214. If the gap is due to a low voltage pulse, the voltage across capacitor 208 falls below the threshold of inverter 206, and inverter 206 produces a positive pulse which is applied to filament selection flip-flop 44. If the voltage gap is due to a short duration transient, capacitor 208 cannot discharge to a level sufficiently low to cause inverter 206 to produce a positive pulse before the gap ends and energizing power returns, and a positive pulse is not applied to filament selection flip-flop 44. At the end of the low voltage pulse, energizing power returns and capacitor 208 begins to charge. When the voltage across capacitor 208 exceeds the threshold of inverter 206, the output of inverter 206 returns to a logical "0" state.

Low voltage regulator 68 provides positive 15 volt control voltage and energizing power for indicator lamps 38, 42, and 62. Resistor 216 limits the current through low voltage regulator 220 and is sized to limit the current through diode 218. Diode 218 limits the voltage that can be applied to the input of voltage regulator 220. Capacitor 222 is fully charged during normal operation and ensures that the input to regulator 220 is available upon occurrence of negative voltage on line 72. Diode 224 prevents capacitor 222 from discharging through terminal 68 during occurrence of a negative voltage pulse thereon. Capacitor 226 limits the ripple on the output of regulator 220. Regulator 220 includes a heat sink.

Diode 228 is provided to ensure that circuit 12 is not damaged if positive voltage is inadvertently applied to terminal 70. Diode 228 is mounted to a heat sink to prevent thermal damage from occurring to it during normal operation of circuit 12.

FIGS. 4a and 4b present suitable sizes for the more important components of circuit 12 and identification of suitable components for use in circuit 12.

What is claimed is:

1. A system for providing bidirectional communication between an electric light having at least two sources of visible light which can be individually energized and a controller located remotely with respect to said electric light, said system comprising:
   a source of voltage located at said controller for producing a voltage suitable for energizing said light sources;
   a pair of electrical conductors for applying said energizing voltage to the electric light;
   switch means located at the electric light for receiving said applied energizing voltage and energizing a light source in response thereto;
   means located at the controller for providing an indication in response to an interruption of current flowing between said source of voltage and said energized light source;
   first means located at the electric light for monitoring the integrity of said energized light source; and
   second means located at the electric light for monitoring the integrity of said de-energize light source,
   said switching means being responsive to said first means for monitoring such that upon failure of said energized light source energizing voltage is applied to the de-energized light source and said indicator means indicates the failure of said light source, and upon failure of the de-energized light source said energizing voltage is applied to the de-energized light source whereby said first means for monitoring causes said energizing voltage to be switched back to the good light source and said indicator means indicates the failure of said light source.

2. The system recited by claim 1 wherein said second monitoring means monitors the integrity of said de-energized light source by monitoring the voltage on the low side of each of said de-energized light source and the energized light source.

3. The system recited by claim 2 wherein said monitoring means determines that said de-energized light source has failed when the voltage at both said low sides drop below a predetermined level.

4. The system recited in claim 1 wherein said first monitoring means monitors the integrity of said energized light source by monitoring the level of illumination provided by said energized light source.

5. The system recited by claim 1 wherein said means located at the controller for providing an indication includes a current sensor and an indicator lamp.

6. The system recited by claim 1 wherein said first means for monitoring includes a photosensitive element and wherein said second means for monitoring includes a continuity check circuit.

* * * * *

UNITED STATES PATENT AND TRADEMARK OFFICE
CERTIFICATE OF CORRECTION

PATENT NO. : 4,767,968

DATED : August 30, 1988

INVENTOR(S) : Michael Geanous et al

It is certified that error appears in the above-identified patent and that said Letters Patent is hereby corrected as shown below:

Column 4, line 21, after "apparatus", insert --.--.

Column 5, line 40, "suitable," should read --suitable--.

Column 6, line 45, "IS", should read --18--.

Signed and Sealed this

Twenty-eighth Day of February, 1989

Attest:

DONALD J. QUIGG

Attesting Officer

Commissioner of Patents and Trademarks